United States Patent [19]

Franklin

[11] Patent Number: 4,942,668

[45] Date of Patent: Jul. 24, 1990

[54] DIGITAL INCLINOMETER

[75] Inventor: Robert C. Franklin, Los Gatos, Calif.

[73] Assignee: Zircon International, Inc., Campbell, Calif.

[21] Appl. No.: 192,809

[22] Filed: May 11, 1988

[51] Int. Cl.$^5$ .............................................. G01C 9/06
[52] U.S. Cl. ..................................... 33/366; 33/1 N; 33/1 PT
[58] Field of Search ...................... 33/366, 1 N, 1 PT; 250/231 SE

[56] References Cited

U.S. PATENT DOCUMENTS

| | | | |
|---|---|---|---|
| 2,445,517 | 7/1948 | Dicks | 33/366 |
| 2,789,362 | 4/1957 | Maroth | 33/366 |
| 3,206,151 | 9/1965 | Lillestrand | 33/366 |
| 3,241,245 | 3/1966 | Levine | 33/366 |
| 3,276,123 | 10/1966 | Huggenburger | 33/366 |
| 3,371,424 | 3/1968 | Sweet | 33/366 |
| 3,835,546 | 9/1974 | Jaquet | 33/366 |
| 3,861,052 | 1/1975 | Siegfried | 33/366 |
| 3,863,067 | 1/1975 | Gooley | 33/366 |
| 3,945,128 | 3/1976 | Weiss | 33/366 |
| 4,027,399 | 6/1977 | Armstrong | 33/366 |
| 4,077,132 | 3/1978 | Erickson | 33/366 |
| 4,079,521 | 3/1978 | Uhorczak | 33/366 |
| 4,085,375 | 4/1978 | Galuschak | 33/366 |
| 4,094,073 | 6/1978 | Parra | 33/366 |
| 4,110,609 | 8/1978 | Beer | 33/366 |
| 4,154,000 | 5/1979 | Kramer | 33/366 |
| 4,182,046 | 1/1980 | Ludlow et al. | |
| 4,265,027 | 5/1981 | Burniski | 33/366 |
| 4,318,225 | 3/1982 | Jenkinson | 33/1 PT |
| 4,592,147 | 6/1986 | Herman | 33/366 |
| 4,606,133 | 8/1986 | Mills | 33/366 |
| 4,620,092 | 10/1986 | Hara | |
| 4,680,466 | 7/1987 | Kuwahara et al. | 250/231 SE |
| 4,685,218 | 8/1987 | Wolf | 33/366 |
| 4,716,534 | 12/1987 | Baucom et al. | |
| 4,720,920 | 1/1988 | Tudek | |

FOREIGN PATENT DOCUMENTS

| | | | |
|---|---|---|---|
| 2515295 | 10/1976 | Fed. Rep. of Germany | 374/154 |
| 3205206 | 8/1983 | Fed. Rep. of Germany | 33/366 |
| 0769327 | 10/1980 | U.S.S.R. | 33/366 |
| 0927023 | 4/1984 | U.S.S.R. | 33/366 |
| 1185085 | 10/1985 | U.S.S.R. | 33/366 |
| 2180654 | 4/1987 | United Kingdom | 33/366 |

OTHER PUBLICATIONS

Article entitled "Capacitance-Based Angular Measurement" by Tom Donahoe, Sperry Corporation, Nov. 1955, SENSORS Magazine.
Description of Heath Kit/Zenith Digital Levelmeter from Heathkit 40th Anniversary Catalog (data unknown(, p. 99.
PATENT ABSTRACTS OF JAPAN, vol. 10, No. 229 (P-[2285], Aug. 8, 1986.

Primary Examiner—Thomas B. Will
Attorney, Agent, or Firm—Skjerven, Morrill, MacPherson, Franklin & Friel

[57] ABSTRACT

A digital inclinometer for detecting the angular orientation of a structure includes a rotatable encoding disk on which is mounted a horizontal tilt sensor. The inclinometer electronically measures, by angular indices on the encoding disk, the difference between the angular orientation of the device and a horizontal orientation. In another embodiment, the encoding disk is rotated by a stepper motor and the number of steps are electronically counted to determine the angular orientation. The inclinometer has a digital display.

4 Claims, 5 Drawing Sheets

DIGITAL INCLINOMETER

FIELD OF THE INVENTION

This invention pertains to a digital means of sensing and displaying the angular position of a surface relative to a known reference such as horizontal level. The invention provides the user, such as a carpenter or other tradesperson, with a quick and accurate method of determining the relative angle of a surface.

BACKGROUND OF THE INVENTION

The standard spirit level which is typically used to determine if a surface is level or plumb provides a rugged and accurate means of accomplishing its purpose. In situations where an angle other than level or plumb is to be measured the spirit level does not provide the necessary flexibility, and in many cases it compromises accuracy. In recent years electronic inclinometers have been developed which provide a digital readout of angular displacement. Some of these inclinometers measure the relative angle using analog techniques, with the analog signal being converted to a digital signal using well-known methods. An example would be the AngleStar TM manufactured by Sperry, which uses a dielectric fluid between capacitance plates to sense angular position. The position of the liquid between the plates is a function of the angle of the surface being measured and thus modifies the inter-plate dielectric and, hence, the capacitance. After the analog signal is converted to a digital signal the electronic circuitry provides a digital readout of the surface angle over a limited angular rotation. Another digital inclinometer is presently marketed by Heath (Zenith), Model SM-2370, which uses a pendulum system to which is attached an encoder disk such that movement of the pendulum allows an optical sensing means to produce digital signals which can be counted and displayed by appropriate circuitry. This product provides one-half degree resolution over a range of plus or minus one hundred twenty degrees from level. Two other techniques for measuring surface angles are described in U.S. Pat. No. 4,077,132 issued to Erickson and U.S. Pat. No. 4,094,073 issued to Parra. There are two main shortcomings observed in the digital inclinometer systems mentioned above. First, the conversion from an analog to digital signal (with the exception of the Heath unit) has associated with it the problems of thermal drift and linearity. Second, there is a limited angular rotation over which an accurate and reliable readout can be obtained.

It should be indicated that using an optical means to detect the position of a bubble in a spirit level has been described in several patents, but the inventor is not aware of its use in the manner of the present invention as described below. Several U.S. patents which describe this technique are: Sweet U.S. Pat. No. 3,371,424, Gooley, U.S. Pat. No. 3,863,067, Beer, U.S. Pat. No. 4,110,609, and Kramer, U.S. Pat. No. 4,154,000.

SUMMARY OF THE INVENTION

The present invention provides a system which overcomes the shortcomings listed above by eliminating the need for analog to digital conversion, and allows for operation over a full 360 degree rotation.

In accordance with the present invention a horizontal tilt sensor is fixed on a rotatable encoder, typically a disk. The encoder disk rotates on a shaft in a housing. The encoder disk has an index on it. The horizontal tilt sensor senses that the encoder is in a horizontal orientation. The encoder disk then rotates to the point where the index is detected by an index sensor fixed to the housing. The amount of rotation by the encoder disk between the horizontal orientation and the detection of the index is digitally measured and displayed on a digital display as being the angle of the housing relative to horizontal.

In essence, the present invention is a rotatable disk with a horizontal tilt sensor on it and also an index mark. An index sensor detects the index mark, and then an electronic circuit digitally counts the amount of rotation of the disk from the time of detection of the index mark until the disk is in a horizontal position as detected by the horizontal tilt sensor. The amount of rotation counted is the inclination to be measured.

The tilt sensor, in one embodiment, is configured to sense a reference orientation of the encoder other than horizontal.

One embodiment of the present invention utilizes an encoder disk which is rotated through 360 degrees using a small direct current drive motor, and an associated optical system which produces two digital signals. One signal results from the sensing of light through a narrow index window at an inner radius of the encoder disk. This signal references a particular starting point in the rotational position of the disk. The second signal results from light which is alternately interrupted by equally spaced opaque stripes located around the otherwise transparent outer circumference of the encoder disk. Since each opaque stripe (or the corresponding transparent stripe) can represent a whole or fractional degree of angular rotation, counting the number of stripes passing through the optical sensing system provides a means of determining angular rotation from the reference index window. A tilt sensor fixed to the encoder disk which determines when the encoder disk has just passed through a horizontal level position and produces a third signal in response thereto. The three signals just described, when used with a presettable up/down digital counter, provide a means of determining the angular position of the encoder relative to horizontal. The resulting digital count is displayed on an appropriate system such as a multi-digit liquid crystal display (LCD) or light-emitting diode (LED) display.

Another embodiment of the present invention substitutes a stepper motor to rotate the encoder assembly rather than the D.C. motor. This also permits elimination of the opaque stripe portion of the encoder disk and its associated light detection means.

DETAILED INVENTION DESCRIPTION

Figure 1B:
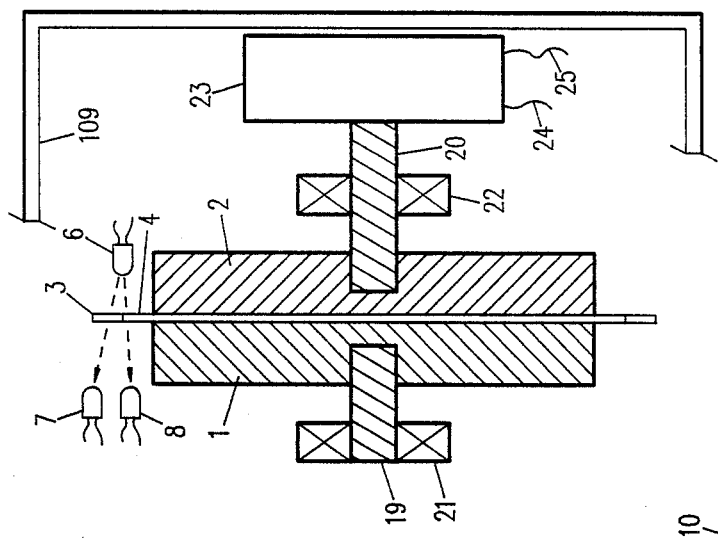
FIGS. 1A and 1B show front and sectional views of one embodiment of the encoder system and the associated optical sensing means and tilt sensor of this invention.
Figure 1C:
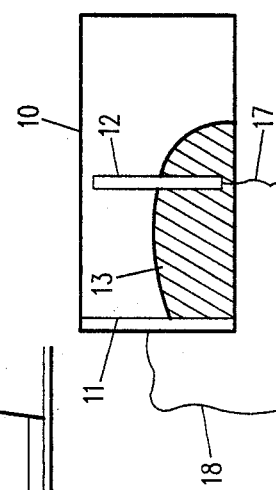
FIG. 1C shows an expanded view of the tilt sensor of this invention.
Figure 1A:
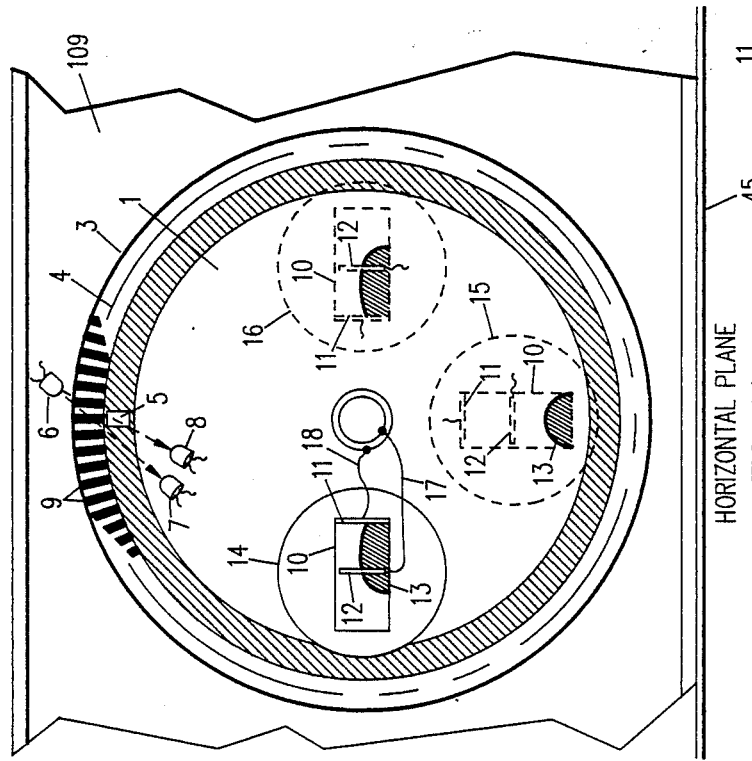

Referring to FIGS. 1A and 1B, the encoder assembly 3 contains two encoder mounting sections 1 and 2 which hold between them the encoder disk 4 and allow rotation of the same on shafts 19 and 20 in conjunction with bushings 21 and 22. Mounting sections 1 and 2 are made of non-conductive material such as plastic and are arranged such that once the encoder disk 4 is accurately located relative to the rotational center of the mounting sections 1 and 2, the sections 1 and 2 are cemented or otherwise fastened together. The encoder disk 4 is composed of a photographic film or a thin glass plate, or other appropriate material on which is produced a pattern consisting of areas that either inhibit or permit transmission of light through the disk. Light emitting diode (LED) 6 floods an area of the encoder disk 4 with light which is typically in, but not restricted to, the infrared spectrum. Phototransistor 7 senses the variation in light intensity received from LED 6 as the encoder disk rotates. Phototransistor 8 receives light from LED 6 when the narrow index window 5 is rotationally positioned between the latter two elements.

Tilt sensor 10 in this embodiment is shown in FIG. 1A in three different positions 14, 15 and 16 representing three different angles of rotation of the electronic level. Tilt sensor 10 is shown as a vial containing a mercury pool 13 which is allowed to move within the vial depending on the rotational position of the encoder assembly 3 and hence the position of the encoder disk 4.

Of the three positions 14, 15 and 16 of tilt sensor 10 shown in FIG. 1A, position 14 represents the condition when the index window 5 is positioned as shown. Position 15 represents the condition after the encoder assembly 3 has rotated counter-clockwise by 90 degrees. When the tilt sensor 10 reaches a position which represents horizontal level (position 16) the mercury pool 13 will just initiate the closure of an electrically conductive path between contacts 11 and 12. FIG. 1C shows an expanded view of tilt sensor 10 in horizontal position 16. Note that mercury pool 13 contacts both contacts 11 and 12, to which are connected respectively wires 18 and 17. This contact closure will be used by associated electronic circuits whose function will be explained later. Wires 18 and 17 are used to connect the contacts 11 and 12 inside tilt sensor 10 to the metal shafts 19 and 20 comprising the rotational axis of the encoder system as shown in FIG. 1B. Bushings 21 and 22 are composed of a metal material such as bronze impregnated with a graphite lubricant, which serve a secondary purpose of providing rotating electrical contacts to the outside, non-rotating system. Motor 23 is shown mechanically coupled to shaft 20 and provides the necessary rotational torque for the encoder system 3. Wires 24 and 25 (FIG. 1B) connect the motor 23 to its electrical power source which will be described later. The motor 23, bushings 21 and 22, LED 6, and phototransistors 7 and 8 are all mounted in a conventional manner to surfaces (not shown) which are part of the mounting housing 109.

Figure 2:
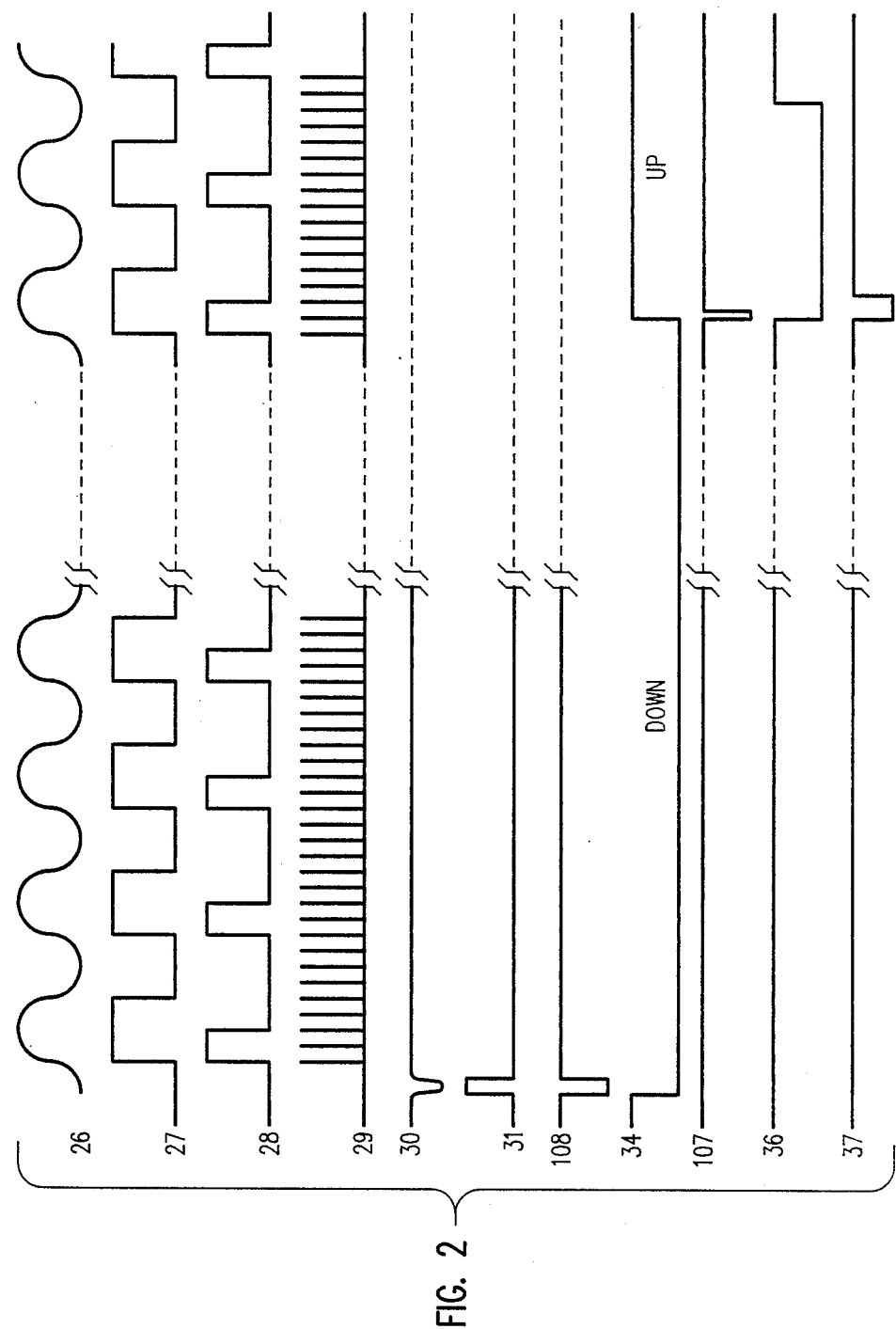
FIG. 2 shows a series of typical timing waveforms produced by the embodiment of the present invention shown in FIGS. 1A and 1B.

The waveforms shown in FIG. 2 represent those produced in one embodiment of the present invention and are displayed in their relative time of occurrence during the rotation of the encoder assembly 3. These waveforms are also shown in the schematic diagram of FIG. 3 according to the points in the circuit where each occurs.

Figure 3:
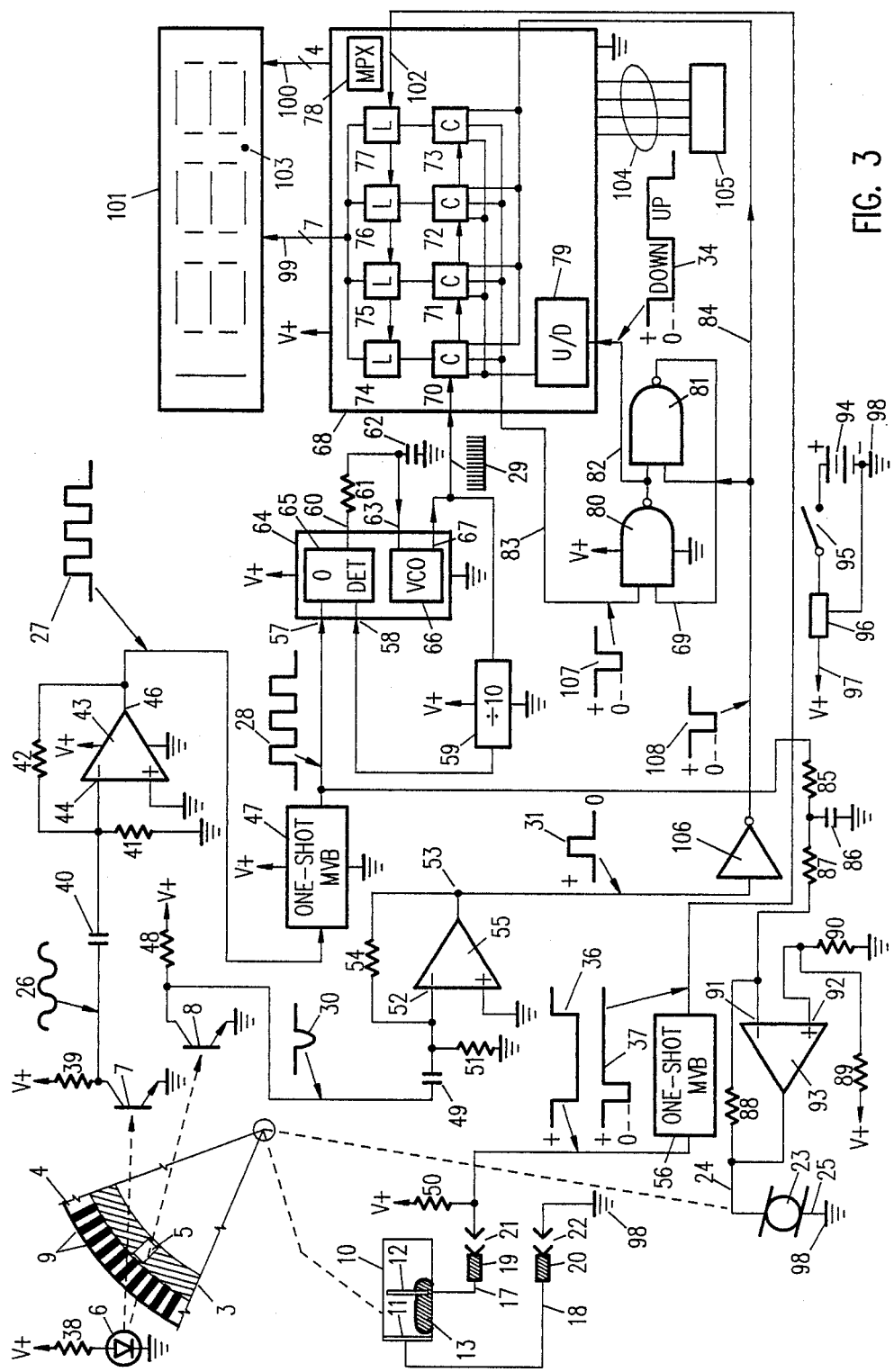
FIG. 3 is a schematic diagram of the electronic circuit utilized in the embodiment of the present invention shown in FIGS. 1A and 1B.

Referring to FIG. 3, drive current for LED 6 is provided from the positive voltage source V+, via current limiting resistor 38. Light from LED 6 passes through the encoder disk 4 and impinges on phototransistor 7. Resistor 39 acts as collector load resistor for phototransistor 7. Light variations arriving at phototransistor 7 result in the generation of a voltage waveform 26 at the collector of phototransistor 7. Waveform 26 is coupled via blocking capacitor 40 to the inverting input 44 of operational amplifier (op-amp) 43. The op-amps used in this invention are used as voltage comparators. Resistors 41 and 42 act as an input termination and feedback element respectively. Op-amp 43 amplifies the input waveform 26 so as to produce a corresponding rectangular waveform 27 at its output 46. In a similar manner light passing through the index window 5 will impinge on phototransistor 8, producing a negative-going waveform 30 at the junction of the collector of phototransistor 8 and load resistor 48. This waveform is coupled through capacitor 49 to the inverting input 52 of op-amp 55. Resistors 51 and 54 act as an input termination and feedback element respectively. Op-amp 55 amplifies the input waveform 30 so as to produce a corresponding positive waveform 31 at its output 53.

Waveform 27 is applied to a one-shot multivibrator 47 which has the function of producing an output pulse 28 of a given width for each positive transition of the input waveform 27. Providing a constant-width pulse 28 is necessary for the operation of the motor speed control. The constant-width pulses 28 are filtered by the low-pass filter composed of resistors 85 and 87, and capacitor 86. The resulting signal is applied to the inverting input 91 of op-amp 93. Resistor 88 sets the op-amp gain, and resistors 89 and 90 define the desired motor speed by establishing a positive reference voltage at input 92 of op-amp 93. It can, therefore, be seen that a positive voltage developed at the output 24 of op-amp 93 will cause motor 23 to rotate, which, in turn, results in a rotation of the encoder assembly 3. At slow speed constant width pulses 28 are far apart but as the speed of rotation increases these pulses come closer together and thus average voltage increases. The speed of the encoder assembly will increase as the voltage of output 24 increases until the frequency of the derived encoder signal 27 and, hence signal 28, reach a value which, when averaged by the low pass filter (resistors 85 and 87 and capacitor 86), will cause the voltage at input 91 of op-amp 93 to essentially equal the voltage at input 92. Once these two voltages are approximately equal, the output 24 of op-amp 93 will be reduced until the motor is no longer accelerating, and the system reaches an equilibrium condition, producing only minor corrections for variations in speed.

If, for instance, the encoder assembly is rotating at a constant speed of approximately one revolution every two seconds, and if the opaque stripes 9 on encoder 4 are spaced one degree apart, the resulting frequency will be 360 times ½ Revolutions/second or 180 pulses/second. More often than not it is desired to provide better angular resolution than would be produced by a one degree separation of the encoder stripes. This can be accomplished by simply spacing the stripes at, say, one-tenth degree intervals. A problem arises, however, if the encoder disk is of a sufficiently small diameter so as to make the physical spacing of the stripes difficult to accomplish without a complex optical system. To avoid these inherent problems, an alternate means of subdividing the angular spacing of the encoder stripes 9 is provided using an electronic phase-lock-loop (PLL). The PLL is accomplished using a commercially available integrated circuit such as the CD4046 manufactured by RCA and others. Referring again to FIG. 3, the PLL integrated circuit 64 contains a phase detector 65 and a VCO, voltage controlled oscillator, 66. Inputs 57 and 58 to the phase detector 65 are defined such that the output 60 of the phase detector becomes predominantly positive if the frequency of the signal on input lead 57 is higher than the frequency of the signal on input lead 58. A low-pass filter composed of resistor 61 and capacitor 62 filters the resulting phase detector output signal on lead 60 and applies the resulting voltage to the input lead 63 of VCO 66. Increasing the positive voltage level at input lead 63 causes the VCO output frequency on lead 67 to increase. Integrated circuit 59 is shown as a decade counter (divide by 10) but may use other divisors to provide different resultant VCO frequencies. If, as previously stated, the 180 pulse per second encoder frequency, represented by waveform 28, is applied to input lead 57 of the phase detector 65, the resultant VCO frequency would be driven to 1800 pulses per second (given properly selected values for the low pass filler resistor 61 and capacitor 62) so that, when the frequency is divided by ten via decade counter 59, the phase detector input 58 will also be 180 pulses per second. Waveform 29 is therefore ten times the frequency of waveform 28. It should be emphasized that neither the exact frequency nor the long term frequency stability of waveform 28 is important. It is, however, important that the short term stability of the frequency of waveform 28 be sufficient such that the encoder disk does not appreciably change rotational speed between successive pulses of waveform 28. In this way each pulse of waveform 29 represents one tenth degree of angular rotation of the encoder assembly 3.

Integrated circuit 68 is a multi-decade up/down counter with self-contained count latches, zero-count detection and display drivers. An example of such a circuit is a series ICM7217 manufactured by Intersil, Inc. The pulses of waveform 29 which are present on line 67 are applied to the input of decade counter 70. Decade counters 70 through 73 will count up or down as directed by the up/down or "U/D" control 79. Line 84 transmits a signal which presets the counters 70 to 73 to a specific value in response to a signal from op amp 106 which in turn responds to window 5 passing LED 6 and thus allowing light from LED 6 to cause transistor 8 to produce a negative going pulse on its collector. The specific value to which counter 70 to 73 are preset is determined by the signals stored in preset logic 105. Line 104 connects the inputs of integrated circuit 68 to preset logic 105. In this example the value preset into the counters is 1800. The significance of this value is that it is 10 times 180 degrees, as described below. NAND gates 80 and 81 comprise a bistable circuit which can be toggled from one state to another by applying zero level signals at lines 83 or 84. The multidigit LED display 101 is shown to be driven in a multiplexed mode via seven segment lines 99 and four digit select lines 100.. A liquid crystal display can be substituted by using an appropriate LCD driver. Decimal point 103 is used to indicate that the rightmost digit represents tenths of a degree of angular rotation.

At the rotational speeds of up to 2 revolutions per second as would typically be used in this invention, the mercury in the tilt sensor 10 would provide accurate sensing of the horizontal. As previously mentioned, the tilt switch 10 will produce a circuit closure of contacts 11 and 12 when the encoder assembly 3 rotates to a point whereby the mercury pool 13 is just passing through a horizontal position Just prior to reaching this position line 17 will be at a positive potential, being held there by the supply voltage V+ via resistor 50. This condition is indicated as the positive potential of waveform 36. At the time of closure of tilt switch 10, line 17 will drop to ground potential as indicated on waveform 36. This change triggers one-shot multivibrator 56 which, in turn, produces a short, negative-going pulse 37 which is routed to the counter latches 74 through 77 via line 102. At this instant the count which exists in counters 70 through 73 will be stored in the latches for subsequent multiplexing to the appropriate display digits.

To explain the use of the electronic level, consider the situation in which the mounting housing 109 (FIGS. 1A and 1B) is positioned so as to be absolutely parallel with the horizontal plane 45, and the encoder assembly is just rotating into a position such that phototransistor 8 is now receiving sufficient light through the index window 5 to cause waveform 31 to make its leading-edge zero to positive transition. Waveform 108 will now make its transition from positive to zero causing counters 70 through 73 to be preset to 1800 (180.0 degrees) as previously mentioned. Also, waveform 108 will toggle the bistable circuit composed of gates 80 and 81 to a state in which line 82 is low. Line 69 feeds back the output of gate 81 to gate 80. This low level, when routed to the U/D control 79 of integrated circuit 68, will place the counters 70 through 73 in a count down-mode. As the encoder assembly 3 rotates, each pulse of waveform 29 will cause the counters of integrated circuit 68 to decrement by one-tenth degree (e.g. 179.9, 179.8, . . . ). Since the mounting housing is level and the tilt switch has been factory aligned to close at absolute horizontal level, the tilt switch will just close when the counters have decremented to 000.0 degrees. The resulting tilt switch closure will generate waveform 37 causing the zero count to be stored in latches 74 through 77 and thus displayed on display 101 as 000.0 degrees. At the same time the zero count detector of integrated circuit 68 will produce a zero output on line 83 (waveform 107) which will toggle the bistable circuit such that line 82 at the output of gate 80 will become positive, thus switching the U/D control 79 to a count-up mode. In this example switching the U/D control is insignificant since the important count has already been latched and displayed. If the mounting housing 109 were now rotated clockwise by 10.0 degrees the same series of events would take place except that the tilt switch would not close until the counters had counted down to zero, then back up to 010.0 at which time that count would be latched and displayed.

System power is supplied from battery 94. Closing power switch 95 applies the positive battery voltage to the voltage regulator 96 which regulates the output voltage V+ on line 97 to a prescribed value such as +5 volts. The common (ground) return to the battery 94 is provided on line 98.

Figure 4B:
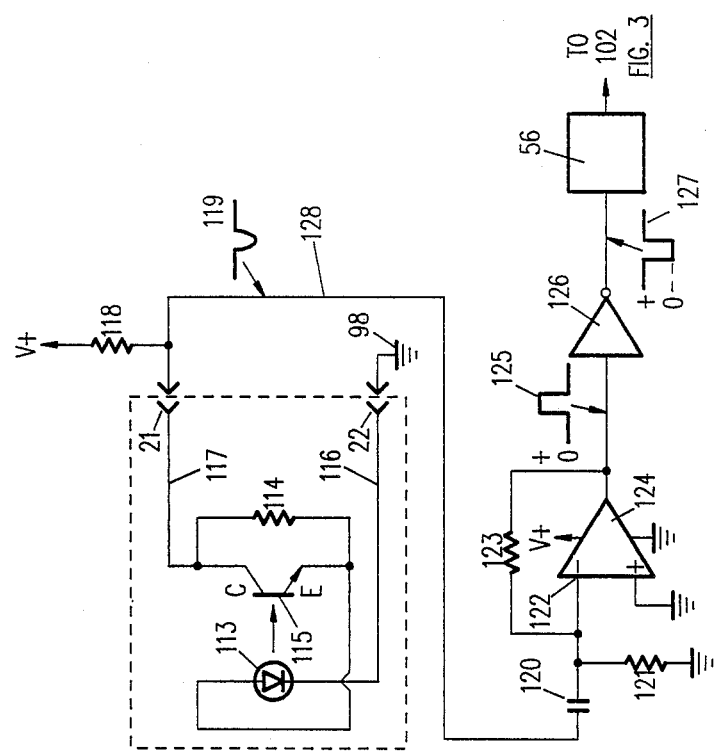
FIG. 4B shows the schematic diagram of the light detecting means used with the second alternate tilt sensor shown in FIG. 4A.
Figure 4A:
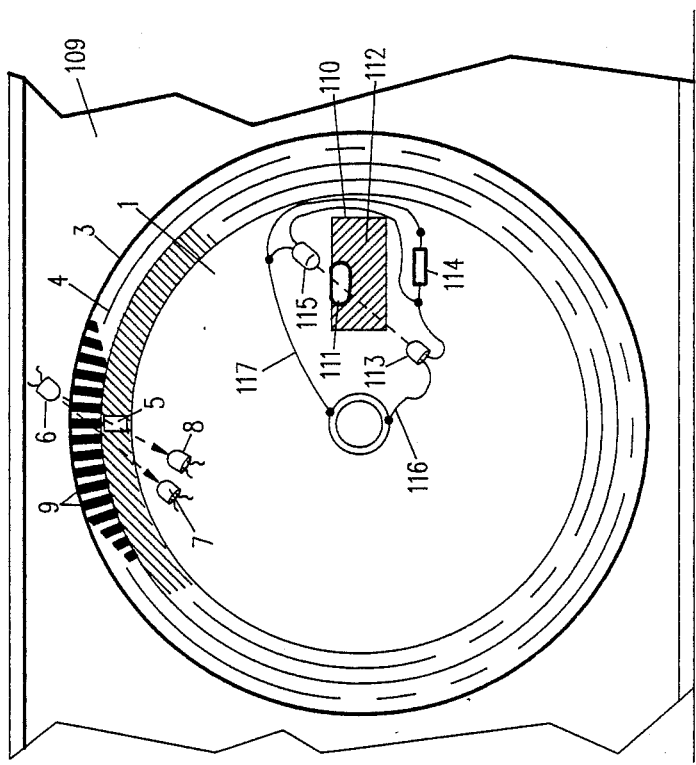
FIG. 4A shows a second alternate means of sensing the tilt of the encoder system in accordance with this invention, using a spirit level and associated light detecting means.

FIG. 4A shows an alternate means of detecting the tilt of the rotating encoder assembly 3 relative to the horizontal plane 45. This alternate means involves substituting a spirit level bubble vial 110 for the tilt switch 10 used in the previous circuit description. The bubble vial 110 is mounted on encoder section 1 and thus rotates with that section and could, in fact, be part of section 1 if that section were fabricated from a clear plastic material which would allow for transmission of light through the material. LED 113 illuminates a portion of the bubble vial such that light passes through the vial to phototransistor 115. Wire 116 connects LED 113 to bushing 22. Wire 117 connects the collector of phototransistor 115 to bushing 21. The bubble 111 floats in fluid 112 in such a manner that the left edge of the bubble just interrupts the light beam as the bubble vial 110 passes through horizontal level. At this time more light will be received by phototransistor 115 and the resulting change in collector current of phototransistor 115 will be coupled to the external, non-rotating circuits. This change in transmitted light through the left edge of bubble 111 performs the equivalent function as the closure of the mercury tilt switch 10 as was previously described. The position of bubble vial 110 is shown as it would be after 180 degrees of rotation of the encoder assembly 3 and is equivalent to position 16 of the tilt switch 10 shown in FIG. 1A. The diameter of the bubble vial 110 must be large enough such that, during the rotation of encoder assembly 3, the transition of the bubble 111 through the light received by the phototransistor 115 only occurs at one point per revolution.

In order to allow the use of the two electrical contact bushings 21 and 22 to couple the tilt signal to the external circuitry a two terminal optical circuit is provided. FIG. 4B is a schematic diagram of the circuit and its interface connection to the previously described circuitry of FIG. 3. Referring to FIG. 4B, current for LED 113 is provided by the voltage source V+ through resistor 118, the rotating contact of bushing 21, resistor 114, the LED itself, then through the other rotating contact of bushing 22, and finally to the ground connection 98. The above described current path assumes that no light is being received at the base of phototransistor 115. When the bubble 111 passes between LED 113 and phototransistor 115 the light received by phototransistor 115 will cause its collector current to increase.

Since the collector-emitter connections of phototransistor 115 are in parallel with resistor 114 the increased collector current in 115 will reduce the effective resistance of the parallel combination and, thus, cause increased LED current to flow which, in turn, increases its light output. This has the regenerative effect of increasing phototransistor collector current, and so on until equilibrium is reached. The net effect is to produce a small, negative-going signal on line 128 as represented by waveform 119. This signal is coupled via capacitor 120 to inverting input 122 of op-amp 124. Resistors 121 and 123 act as an input termination and gain setting elements respectively. The resulting output waveform 125 is inverted by inverter gate 126 and routed as waveform 127 to the one-shot multivibrator 56, which was previously described.

It can thus be seen that the bubble vial, in conjunction with additional circuitry, can be substituted for the mercury tilt switch.

Figure 5:
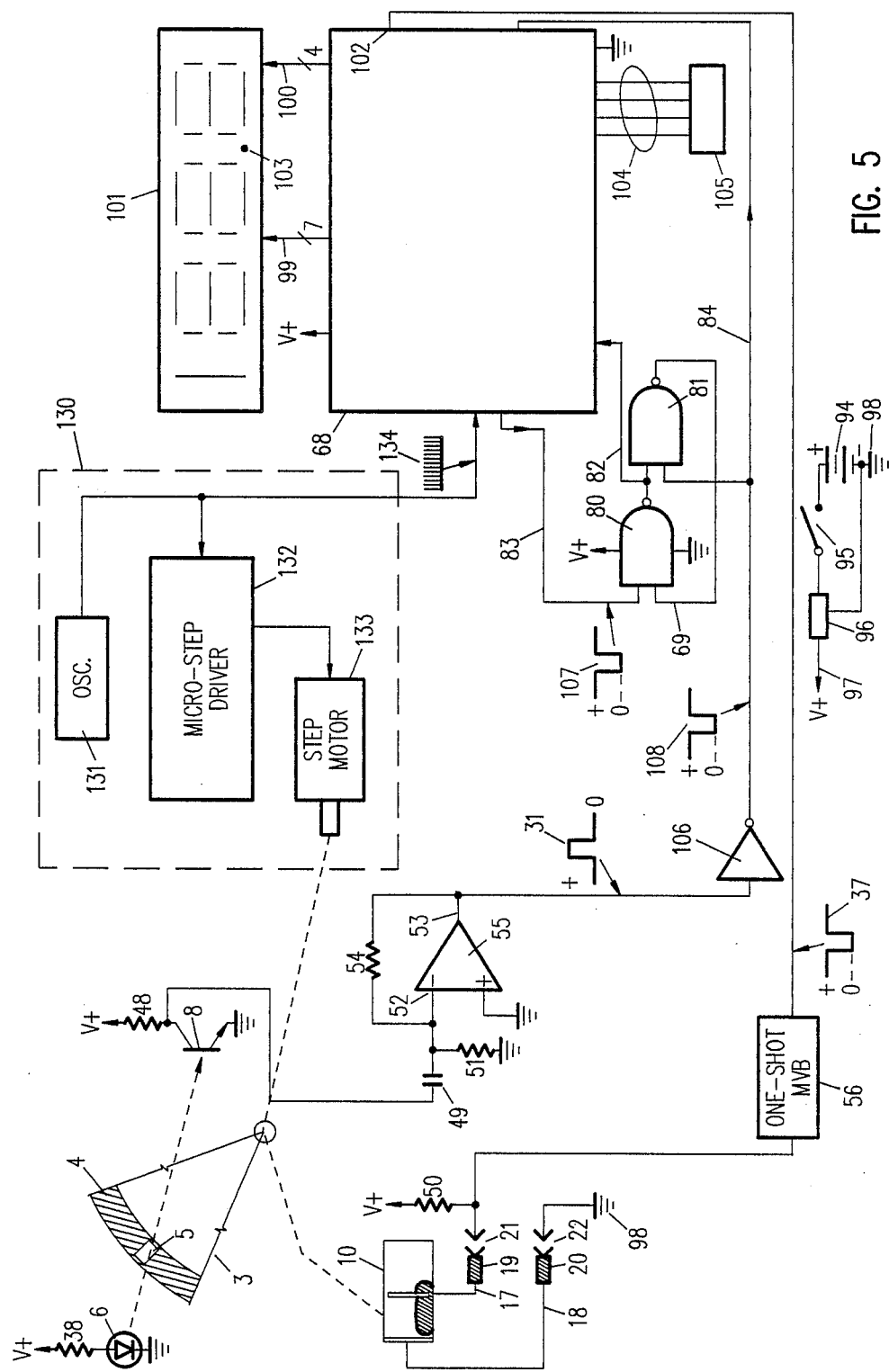
FIG. 5 shows an alternate means of determining angular rotation using a stepper motor.

As yet another embodiment of the present invention, it was previously mentioned that a stepper motor could be substituted for the D.C. motor used to rotate the encoder assembly 3. FIG. 5 shows a schematic representation of the present invention using a stepper motor. Certain elements of FIG. 5 are the same as those previously described and shown in FIG. 3, but have been partially repeated to clarify the circuit description. Item 130 of FIG. 5 represents the stepper motor system. Oscillator 131 produces a frequency output represented by waveform 134 which is routed to the counter 68 and the micro-step driver 132. Normally a stepper motor is designed such that it will rotate a prescribed angle each time the relative current to its windings in changed in phase. A typical step angle might be 0.9 degrees, requiring 400 steps per motor revolution. Thus a digital signal can be used to position the stepper motor shaft by simply applying a given number of pulses to its drive circuit from a known angular reference. In recent years a technique has been developed, known as microstepping, in which defined current pulses, when applied to the phase windings of the stepper motor, will cause the stepper motor to rotate a fraction of its normal step angle. For example, using a microstepping drive, the stepper motor could be made to step one-tenth degree for each input pulse. If, for the sake of explanation, the microstepping drive circuit 132 were designed to produce a stepper motor 133 shaft rotation of one-tenth degree for each positive transition of waveform 134, it simply would be necessary to count these transitions using the up/down counter 68 in a manner previously described. Thus the number of waveform 134 transitions counted between the reference window pulse 108 and the tilt switch signal 37 would represent the relative angle between the mounting housing 109 and the horizontal plane 45.

While all of the above discussion has referred to the use of a known up/down counter circuit 68 to perform the necessary counting and logic function, it should be understood that one skilled in the art could substitute a microprocessor to perform a similar function. In fact there are certain enhancement functions that could be provided through the use of a microprocessor. For example, a microprocessor could be used to increase the speed of the drive motor 23 or 133 during that portion of the encoder assembly 3 revolution which is significantly removed from the last closure of the tilt switch. In this way the encoder assembly 3 would slow to an acceptable rate during that portion of the revolution in which the closure of the tilt switch is anticipated. In a similar theme, and especially if a stepper motor were used, a microprocessor could command the stepper motor to step back and forth through the point of closure of the tilt switch, at all times adding or subtracting the counted pulses as required to provide the necessary angular readout. If the mounting housing 109 was moved such that the tilt switch did not close when anticipated, the microprocessor would establish a search mode which would rapidly rotate the encoder assembly until the tilt switch closure was found and a back and forth oscillation resumed.

Although several embodiments of the invention have been described herein, variation and modification of the mechanical, optical, and electrical components may be made without departing from the scope of the invention.

I claim:

1. A digital inclinometer comprising:

encoding means for indicating rotation rotated by a direct current motor;
means for sensing a certain orientation fixed to the encoding means; and
means for counting the rotation of the encoding means between a particular position of the orientation sensing means and the certain orientation of the orientation sensing means;
wherein the counting means includes;
an index on the encoding means;
means for sensing the index; and
means for measuring digitally the angular distance that the encoding means rotates between the detection of the index by the index sensing means and the certain orientation of the orientation sensing means;
wherein the measuring means includes;
transparent angular index marks forming a part of the encoding means, light-generating means, and light-responsive means for generating an electronic signal in response to light transmitted by the light-generating means through the portion of said encoding means having the angular index marks;
a first comparator having two input terminals with the first terminal electrically connected to ground and the second terminal electrically connected to receive the signal generated by the light-responsive means, to produce a first comparator output signal on an output lead;
a first multivibrator having an input terminal electrically connected to the first comparator output lead to produce a first multivibrator output signal on an output lead;
a second comparator having two input terminals with the first terminal electrically connected to ground and the second terminal electrically connected to an output lead of the index sensing means, so as to produce a second comparator output signal on an output lead;
a second multivibrator having an input terminal electrically connected to an output lead of the orientation sensing means, so as to produce a second multivibrator output signal on an output lead;
motor control means electrically connected to the output lead of the first multivibrator, to control the motor speed;
phase-locked loop means electrically connected to the output lead of the first multivibrator to increase angular resolution and having an output lead;
an up/down counter having three input terminals electrically connected respectively to the output lead of the phase-locked loop means, to the second multivibrator output lead, and to the second comparator output lead, to produce an output signal on an output lead; and
a digital display electrically connected to the counter output lead to visually display the measured angular distance.

2. A digital inclinometer comprising:
encoding means for indicating rotation rotated by a stepper motor;
means for sensing a certain orientation fixed to the encoding means; and
means for counting the rotation of the encoding means between a particular position of the orientation sensing means and the certain orientation of the orientation sensing means;
wherein the counting means includes:
an index on the encoding means;
means for sensing the index; and
means for measuring digitally the angular distance the encoding means rotates between the detection of the index by the index sensing means and the certain orientation of the orientation sensing means;
wherein the measuring means counts the number of steps of the stepper motor needed to rotate the encoding means between detection of the index and the certain orientation of the orientation sensing means; and
a comparator having two input terminals with the first terminal electrically connected to ground and the second terminal electrically connected to an output lead of the index sensing means, to produce a comparator output signal on an output lead;
stepper motor drive means including a micro-stepping means and having two output leads, the first output lead providing a signal electrically controlling the stepper motor;
a multivibrator having an input terminal electrically connected to an output lead of the orientation sensing means, so as to produce a multivibrator output signal on an output lead;
an up/down counter having three input terminals electrically connected respectively to the comparator output lead, to the multivibrator output lead, and to the drive means second output lead, to produce an output signal on an output lead; and
a digital display electrically connected to the counter output lead to visually display the measured angular distance.

3. A digital inclinometer comprising:
an encoder assembly rotated by a direct current motor in a housing to indicate rotation;
an index mark on the encoder assembly to indicate the angular position of the encoder assembly;
an index sensor fixed to the housing to detect the index mark;
a tilt sensor to detect a horizontal position fixed to the encoder assembly; and
measuring means for measuring digitally and displaying the mount of rotation of the encoder assembly between a horizontal position detected by the tilt sensor and the detection of the index mark by the index sensor;
wherein the measuring means includes:
transparent angular index marks forming a part of the encoder assembly, light-generating means, and light-responsive means for generating an electronic signal in response to light transmitted by the light-generating means through the portion of said encoder assembly having the angular index marks; and
a first comparator having two input terminals with the first terminal electrically connected to ground and the second terminal electrically connected to receive the signal generated by the light-responsive means, to produce a first comparator output signal on an output lead;
a first multivibrator having an input terminal electrically connected to the first comparator output lead to produce an output signal on an output lead;
a second comparator having two input terminals with the first terminal electrically connected to ground and the second terminal electrically connected to an output lead of the index sensor, so as to produce a second comparator output signal on an output lead;

a second multivibrator having an input terminal electrically connected to an output lead of the tilt sensor, so as to produce a second multivibrator output signal on an output lead;

motor control means electrically connected to the output lead of the first multivibrator, to control the motor speed;

phase-locked loop means electrically connected to the output lead of the first multivibrator to increase angular resolution and having an output lead;

an up/down counter having three input terminals electrically connected respectively to the output lead of the phase-locked loop means, to the second multivibrator output lead, and to the second comparator output lead, to produce an output signal on an output lead; and a digital display electrically connected to the counter output lead to visually display the measured angular distance.

4. A digital inclinometer comprising:

an encoder assembly rotated by a stepper motor in a housing to indicate rotation;

an index mark on the encoder assembly to indicate the angular position of the encoder assembly;

an index sensor fixed on the housing to detect the index mark;

a tilt sensor to detect a horizontal position fixed to the encoder assembly; and measuring means for measuring digitally and displaying the amount of rotation of the encoder assembly between a horizontal position detected by the tilt sensor and the detection of the index mark by the index sensor;

wherein the measuring means counts the number of steps of the stepper motor needed to rotate the encoder assembly between detection of the index mark and the detection of a horizontal position by the tilt sensor; and wherein the measuring means includes:

a comparator having two input terminals with the first terminal electrically connected to ground and the second terminal electrically connected to an output lead of the index sensor, to produce a comparator output signal on an output lead;

stepper motor drive means including a micro-stepping means and having two output lead, the first output lead providing a signal electrically controlling the stepper motor;

a multivibrator having an input terminal electrically connected to the output lead of the tilt sensor, so as to produce a multivibrator output signal on an output lead;

an up/down counter having three input terminals electrically connected respectively to the comparator output lead, to the multivibrator output lead, and to the drive means second output lead, to produce an output signal on an output lead; and a digital display electrically connected to the counter output lead to visually display the measured angular distance.

* * * * *